United States Patent [19]

Kauth et al.

[11] Patent Number: 4,668,720
[45] Date of Patent: May 26, 1987

[54] FLAME RESISTANT MOULDING COMPOUNDS BASED ON STYRENE POLYMERS

[75] Inventors: Hermann Kauth, Krefeld; Hubert Bosshammer, Cologne; Manfred Schmidt; Dieter Freitag, both of Krefeld, all of Fed. Rep. of Germany

[73] Assignee: Bayer Aktiengesellschaft, Fed. Rep. of Germany

[21] Appl. No.: 762,946

[22] Filed: Aug. 6, 1985

[30] Foreign Application Priority Data

Aug. 17, 1984 [DE] Fed. Rep. of Germany ....... 3430286

[51] Int. Cl.$^4$ .......................... C08K 51/00; C08K 5/34
[52] U.S. Cl. ......................................... 524/86; 524/98; 524/100; 524/106; 524/138; 524/139; 524/371; 524/612; 524/502; 524/504; 525/66; 525/186; 525/188
[58] Field of Search ................... 524/86, 98, 100, 106, 524/139, 612, 138, 502, 504, 371; 525/66, 186, 188

[56] References Cited

U.S. PATENT DOCUMENTS

| | | | |
|---|---|---|---|
| T995,004 | 6/1980 | Lawson | 524/371 |
| 2,719,134 | 9/1955 | Coover, Jr. | 525/188 |
| 3,450,677 | 6/1969 | McConnell et al. | 528/73 |
| 3,660,351 | 5/1972 | Schmidt et al. | 524/371 |
| 3,962,164 | 6/1976 | Praetzel et al. | 524/371 |
| 3,980,615 | 9/1976 | Noetzel | 524/139 |
| 4,212,805 | 7/1980 | Buckler et al. | 548/461 |
| 4,403,075 | 9/1983 | Byrd et al. | 524/418 |

FOREIGN PATENT DOCUMENTS 2459685 6/1975 Fed. Rep. of Germany .
2447726 4/1976 Fed. Rep. of Germany .
2800891 7/1978 Fed. Rep. of Germany .

OTHER PUBLICATIONS

H. Vogel: "Flammfestmachen von Kunststoffen", 1966.

Primary Examiner—John Kight
Assistant Examiner—Kriellion Morgan
Attorney, Agent, or Firm—Connolly & Hutz

[57] ABSTRACT

This invention relates to flame resistant moulding compounds produced from mixtures of styrene polymers halogenated organic compounds, special polyphosphonic acid amides and optionally conventional additives.

2 Claims, No Drawings

FLAME RESISTANT MOULDING COMPOUNDS BASED ON STYRENE POLYMERS

The invention relates to flame resistant moulding compounds produced from mixtures of styrene polymers, halogenated organic compounds, polyphosphonic acid amides and optionally conventional additives.

Nmerous components have already been tested and described for flame proofing styrene polymers. Combinations of an aromatic halogen compound with an antimony trioxide as synergistic compound have proved to be particularly suitable. Combinations of this kind are described, for example, by J. Troitzsch, in Brandverhalten von Kunststoffen, C. Hanser Verlag, Munich, Vienna 1982 by W. C. Kuryla, and A. J. Papa, in Flame Retardancy of Polymeric Materials, M. Dekker Inc. New York, 1973.

Combinations of bromine compounds and antimony trioxide are particularly flame resistant. Antimony trioxide has, however, been found to be carcinogenic in animal experiments (see Maximale Arbeits-konzentration und biologische Arbeitsstofftoleranzwerte (Maximum working concentration and biological tolerance values of materials) 1983, Mitteilung XIX der Senatskommission zur Prüfung gesundheitsschädlicher Arbeitsstoffe, Publishers Verlag Chemie). The problem therefore arose of finding flame retarding additives which would produce sufficient flame resistance in styrene polymers in the absence of antimony trioxide.

The object of the present invention is therefore flame resistant moulding compounds produced from mixtures of
- (a) 50 to 90 parts by weight of styrene polymer,
- (b) 10 to 50 parts by weight of flame retardant additive, the sum of (a) and (b) being 100, and optionally
- (c) conventional additives in the usual quantities, characterised in that the 10 to 50 parts by weight of flame retardant additive consist of
- ($b_1$) 5 to 30 parts by weight of at least one conventional organic flame retardant containing at least 4 carbon atoms and 30% by weight of chlorine and/or at least 4 carbon atoms and 40% by weight of bromine, and
- ($b_2$) 5 to 20 parts by weight of at least one polyphosphonic acid amide containing recurrent structural units of the formula I

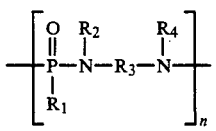

(I)

wherein
$R_1 = C_1-C_6$ alkyl, $C_6-C_{15}$ aryl, $C_2-C_{12}$ alkenyl, $C_7-C_{18}$ alkylaryl or $C_7-C_{18}$ aralkyl,
$R_3 =$ one or more groups selected from $C_2-C_{12}$ alkylene, phenylene 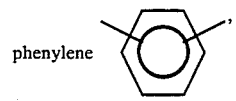

bisphenylene 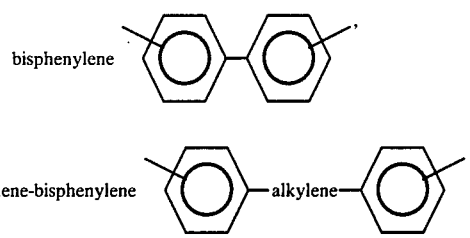

alkylene-bisphenylene 

wherein alkylene = $C_1-C_4$ alkylene, $C_2-C_4$ alkylidene, $C_5-C_{12}$ cycloalkylene or $C_6-C_{12}$ cycloalkylidene, thiobisphenylene 

oxybisphenylene 

sulphonyl-bisphenylene 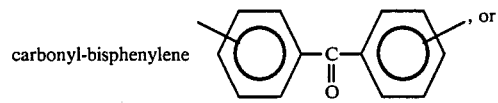

carbonyl-bisphenylene 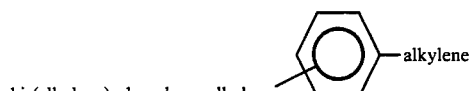, or bis(alkylene)-phenylene: alkylene 

having 1 to 4 carbon atoms in each alkylene group, each of the phenyl nuclei of the $R_1$ and $R_3$ groups being optionally substituted by 1 to 4 $C_1-C_4$ alkyl groups or 1 to 4 halogen atoms (Cl, Br) or by the above mentioned alkyl groups and halogen atoms, $R_2 = R_4 =$ hydrogen or $C_1-C_4$ alkyl or
$R_2$ and $R_4$ together represent an alkylene group with 1 to 6 C atoms connecting the two nitrogen atoms, in which case $R_3$ is restricted to alkylene with 2 to 6 C atoms, and n represents a number from 3 to 20, the sum of the parts by weight of $b_1$ and $b_2$ always adding up to a number from 10 to 50.

The various symbols in formula (I) preferably have the following meanings:

$R_1$: methyl or phenyl, in particular methyl;
$R_2$ and $R_4$: hydrogen or $R_2$ and $R_4$ together represent a $-CH_2-CH_2-$group, in which case $R_3$ is restricted to a $CH_2-C_2-$group,
$R_3$: at least one of the following groups:

wherein
alkylene=$C_1$ to $C_4$ alkylene, in particular $C_1$ or $C_2$ alkylene, and

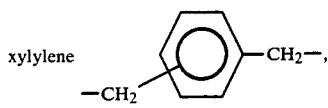

each phenyl nucleus of $R_1$ and $R_3$ being optionally substituted by one or two methyl groups, and n: a number from 3 to 15.

When phosphoric acid esters such as triphenyl phosphate, diphenyl cresyl phosphate or the like are used instead of the polyphosphonic acid amides according to the invention, it is found that the materials treated not only have a much lower dimensional stability in the heat but also insufficient flame resistance.

The term "styrene polymers" is used here to cover homo and copolymers and graft polymers of styrene as well as styrenes alkylated in the nucleus and side chain with alkyl groups having 1 to 3 carbon atoms, preferably with methyls, such as α-methyl styrene, o-, m- or p-methyl styrene or p-isopropyl styrene. Styrene itself is preferred.

The following comonomers may be used as mixtures with styrene for copolymerisation or graft copolymerisation: (meth)acrylonitrile, preferably acrylonitrile; (Meth)acrylic acid esters having 1 to 8, preferably 1 to 4 carbon atoms in the alcohol component, and alkyl styrenes having 1 to 3 carbon atoms in the alkyl group (substituted in the nucleus and side chain), preferably styrene substituted by methyl in the side chain and in the nucleus.

In the case of graft copolymers, from 5 to 90% by weight, preferably from 5 to 70% by weight may be formed by the graft basis and 95 to 10% by weight, preferably 95 to 30% by weight by the grafted monomers. The graft copolymers used according to the invention are known and are prepared by known methods. Depending on the method of preparation employed, the graft polymers may be pure graft copolymers or mixtures of graft copolymers and homo or copolymers of the monomers used for grafting (see "Methoden der Organischen Chemie" (Houben-Weyl), Volume 14/1, publishers Georg Thieme Verlag, Stuttgart 1961, pages 112 to 115 and 393 to 406). The graft basis may in particular consist of polybutadiene or of polymers with rubbery elastic properties obtainable mainly frpm one or more of the following monomers: chloroprene, buta-1,3-diene, isoprene, styrene, acrylonitrile, vinyl acetate, vinyl alkyl ethers having 1 to 6 carbon atoms in the alkyl group and (meth)acrylic acid esters having 1 to 18 carbon atoms in the alcohol component, in other words polymers of the type described, for example, in "Methoden der Organischen Chemie" (Houben-Weyl), Volume 14/1, Georg Thieme Verlag, Stuttgart 1961, pages 393-406, and in C. B. Bucknall, "Toughened Plastics", Applied Science Publishers, London, 1977. Preferred graft copolymers C are at least partially cross linked and have gel contents above 20% by weight, preferably above 40% by weight, in particular above 60% by weight (see also DE-OS No. 1,694,173=U.S. Pat. No. 3,564,077 and DE-OS No. 2,348,377=U.S. Pat. No. 3,919,353).

Organic compounds containing at least 4 carbon atoms and 30% by weight of chlorine and/or at least 4 carbon atoms and 40% by weight of bromine may be used as flame retardant additives if their volatility is sufficiently low at the temperatures of about 200° to 250° C. at which the moulding compounds are worked up and if they have sufficient thermal stability. Compounds of this kind are well known as conventional flame retardant additives and have been described, for example, by W. C. Kuryla and A. J. Papa in "Flame Retardancy of Polymeric Materials", M. Dekker Inc. New York 1973.

The following should be particularly mentioned: decabromodiphenyl, decabromodiphenyl ether, nonabromodiphenyl, nonabromodiphenyl ether, octabromodiphenyl, octabromodiphenyl ether, pentabromodiphenyl ether, hexabromobenzene, tetrabromobisphenol A, tetrabromobisphenyl A-oligocarbonate with a degree of polymerisation of 3 to 15, preferably 3 to 10, halogenated phthalatic acid derivatives such as tetrabromo(chloro)phthalic acid imide, N-alkyl-tetrabromo(chloro)phthalic acid imides having 1 to 4 carbon atoms in the alkyl group and N,N'-bis-[tetrabromo(chloro)phthalimido]-alkanes having 2 to 6 carbon atoms in the alkane chain.

Brominated diphenyl ethers are particularly preferred.

By "conventional additives" are meant, for example, mould release agents, lubricants, heat stabilizers and ultraviolet light stabilizers used in the usual quantities (about 0.1 to 10% by weight, based on components a+b). Conventional additives such as pigments, fillers and reinforcing fillers such as glass fibres, glass fabrics, carbon fibres, titanium whiskers, etc. may also be used in the usual quantities, i.e. up to 50% by weight, based on components a+b.

The polyphosphonic acid amides may be prepared by the process according to German Patent Application No. P 33 42 637.6. In this process, polyphosphonic acid amides corresponding to formula I are prepared by condensing diamines of formula II

with phosphonic acid esters of formula III

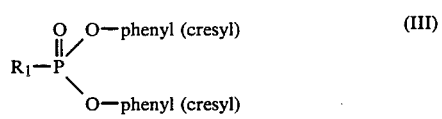

wherein substituents $R_1$, $R_2$, $R_3$ and $R_4$ have the meanings indicated for formula I under solvent free conditions at 50° to 350° C. with removal by distillation of the phenol or cresol split off. The phosphoric acid ester of formula III is used in a quantity of 0.5 to 2 mol per mol of the diamine of formula II and the reaction is optionally carried out in an oxygen-free inert gas atmosphere and optionally in the presence of from $10^{-5}$ to $10^{-1}$ mol percent, based on 100 mol percent of diamine, of a catalyst for accelerating the condensation, such as sodium hydride, sodium amide, sodium alcoholates, titanium tetrabutylate, p-toluene sulphonic acid, etc.

To produce the moulding compounds according to the invention, styrene polymer, flame retardant additive and optionally the usual additives are mixed together at temperatures of 200° C. to 250° C. in a suitable apparatus, e.g. a set of mixing rollers or an extruder, and the mixture is then worked up to produce moulded bodies in a conventional processing machine.

The response to impact stress was tested on standard test rods by measuring the impact strength $a_n$ and notched impact strength $a_k$, both according to DIN 53 453.

The first characteristics were tested both by measuring the $O_2$ index according to ASTM D 2863-70 and by measuring the after-burning time according to the UL test (Subject 94). For these tests, test rods measuring 127×12.7×2.5 mm or 127×12.7×3.2 mm were formed by injection moulding at 200° to 220° C.

The test rods were subjected to the procedure of the combustion test for the classification of materials according to Underwriters Laboratories, Inc. Bulletin 94.

In this test procedure, the tested materials are classified as UL-94 V-O, UL-94 V-I or UL-94 V-II on the basis of the results obtained with 10 samples. The criteria for each of these V-classifications according to UL-94 are briefly as follows:

UL-94 V-O: average burning with a flame and/or glowing after removal of the igniting flame should not exceed 5 seconds and none of the samples should drip to discharge particles capable of igniting a cotton capable of absorbing such particles.

UL-94 V-I: average burning with a flame and/or glowing after removal of the igniting flame should not exceed 25 seconds and none of the samples should drip particles capable of igniting the absorbent cotton.

UL-94 V-II average burning with a flame and/or glowing after removal of the igniting flame should not exceed 25 seconds but flaming particles drip from the samples to ignite absorbent cotton.

Another test rod which burnt for more than 25 seconds after removal of the igniting flame was not classified according to the UL-94 classification but classified as "flammable" under the standard conditions according to the present invention. Regulation UL-94 further requires that all the test rods of a test must fulfil the conditions of the V-classification, otherwise all the 10 test rods are classified according to the assessment of the least flame resistant individual rod. If, for example, one rod is assessed as UL-94 V-II while the 9 other rods are assessed as UL-94 V-O, then all 10 rods are classified as UL-94 V-II.

The parts and percentages given in the examples are by weight unless otherwise indicated.

EXPERIMENTAL PART

Preparation of the polyphosphonic acid amides used.

1. Polyphosphoric acid amide containing recurrent units of formula A

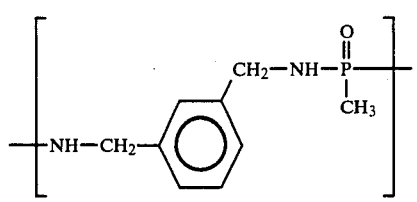

7440 g (30 mol) of methane phosphonic acid diphenyl ester 4080 g (30 mol) of m-xylylene diamine and 0.3 g (7.7×10⁻³ mol) of sodamide are vigorously mixed in an autoclave under nitrogen at 220° C. The mixture continues to be stirred for 2 hours at this temperature under normal pressure. A vacuum rising from 350 to 100 mbar is then applied while the temperature is raised to 240° C., and at the same time phenol is distilled off for 3 hours over a column heated to 130° C. The reaction is then continued for 4 hours at 240° C. and the pressure is gradually lowered to about 1 mbar. Nitrogen is passed through and the product is left to settle and is isolated by discharging it and comminuting it by means of a cooling roller. The polyphosphonic acid amide is soluble in methanol, cresol, glacial acetic acid and dimethyl sulphoxide but insoluble in methylene chloride and has the following properties:

Viscosity $\eta_{rel}=1.14$ (1 g of substance per 100 ml of solution; solvent m-cresol)

Glass transition temperature $T_g=78°$ C.

Average molecular weight (numerical average) $\overline{MWt}_{osm}=1500$.

Yield: 5700 g.

2. Polyphosphonic acid amide having recurring units of formula B

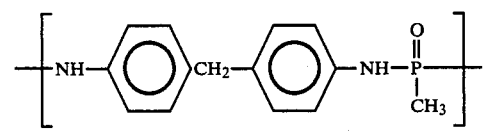

99 g (0.5 mol) of 4,4'-diaminodiphenyl methane are added drop-wise over a period of 1 hour at 240° C. and 150 mbar to 248 g (1 mol) of methane phosphonic acid diphenyl ester. The reaction is catalysed with 50 mg of NaNH₂ and phenol is at the same time distilled off over a column. The reaction is then continued for 6 hours at a temperature of 240° C. and a vacuum rising to about 1 mbar. The column is removed, unreacted starting ester is distilled off, and 185 g of an oligomer having the following properties is obtained:

amino end groups: 0.3%

Visocisty $\eta_{rel}$: 1.1 (1 g of substance per 100 ml of solution, sovent: m-cresol)

Glass transition temperature $T_g=120°$ C.

Average molecular weight (numerical average) $\overline{MWT}_{osm}=950$.

The styrene polymer ABS mentioned in Tables 1 and 2 is a commercially available graft copolymer obtained from 10% of polybutadiene rubber as graft basis, 60% of grafted styrene units and 30% of grafted acrylonitrile units.

Styrene polymer ASA is a commercial graft copolymer consisting of 20% of butyl polyacrylate as graft basis, 22% of grafted acrylonitrile units and 58% of grafted styrene units.

The styrene polymer PS is a commercial impact resistant polystyrene obtained from 6% of polybutadiene rubber as graft basis and 94% of grafted styrene units.

The moulding compounds shown in Tables 1 and 2 were obtained from the given parts of individual components by melting and homogenising in an extruder at 220° C., cooling to room temperature and granulating. The test rods were produced from the granules by injection moulding.

These test rods were used to determine the impact strength $a_n$ and the notched impact strength $a_k$ in $kJ/m^2$ according to DIN 53 453. The oxygen index OI was determined in percent according to ASTM-D 2863-70 and the fire characteristics were determined by the UL test procedure specified in the description, using test rods measuring $127 \times 12.7 \times 3.2$ mm or $127 \times 12.7 \times 2.5$ mm. Tables 1 and 2 show that the moulded bodies obtained from the moulding compounds according to the invention are to be classified as flame retarding (VO, VI) in their fire characteristics whereas moulded bodies treated with octabromodiphenyl ether alone or in combination with triphenyl phosphate as flame retardant additives are not self extinguishing even at a greater thickness.

(c) conventional additives in the usual quantities, characterised in that the 10–50 parts by weight of flame retardant additive consist of (b₁) 5–30 parts by weight of at least one conventional organic flame retardant containing at least 4 carbon atoms and 30% by weight of chlorine and/or at least 4 carbon atoms and 40% by weight of bromine, and (b₂) 5–20% by weight of at least one polyphosphonic acid amide having recurrent structural units of the formula I

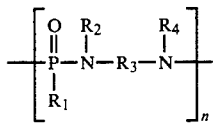

wherein $R_1 = C_1-C_6$ alkyl, $C_6-C_{15}$ aryl, $C_2-C_{12}$ alkenyl, $C_7-C_8$ alkylaryl or $C_7-C_{18}$ aralkyl, $R_3 =$ one or more groups selected from $C_2-C_{12}$ alkylene, phenylene ,

TABLE 1

| | | Moulding compounds according to the invention | | | | | |
|---|---|---|---|---|---|---|---|
| Styrene polymer (parts) | (parts) | Octabromo diphenyl ether (parts) | Vicat B °C. | Impact strength $a_n$ [kJ/m²] | Notched impact strength $a_k$ [kJ/m²] | Oxygen index % | Fire characteristics UL-94 2.5 mm |
| ABS | Polyphosphonic acid amide formula A | | | | | | |
| 100 | 6 | 24 | 101 | 70 | 7 | 26 | VO |
| 100 | 10 | 18 | 100 | 60 | 6 | 26 | VI |
| 100 | 12 | 18 | 100 | 60 | 5 | 26.5 | VO |
| PS | | | | | | | |
| 100 | 10 | 22 | 85 | — | — | — | VO |
| ASA | | | | | | | |
| 100 | 10 | 22 | 90 | 50 | 3 | — | VO |
| ABS | polyphosphonic acid amide formula B | | | | | | |
| 100 | 12 | 18 | 95 | — | 6.7 | 27.5 | VO |

TABLE 2

| | Moulding compounds (Comparison, not according to the invention) | | | |
|---|---|---|---|---|
| Styrene polymer (parts) | Ocatabromodiphenyl ether (parts) | Triphenyl phosphate (parts) | Vicat B (°C.) | Fire characteristics UL-94 3.2 mm |
| ABS | | | | |
| 100 | 18 | — | — | flammable |
| 100 | 26 | — | — | flammable |
| 100 | 18 | 8 | 80 | flammable |
| 100 | 18 | 12 | 75 | flammable |
| ASA | | | | |
| 100 | 22 | — | 91 | flammable |
| PS | | | | |
| 100 | 18 | — | — | flammable |
| 100 | 26 | — | — | flammable |

We claim:

1. Flame resistant moulding compounds produced from mixtures of
   (a) 50–90 parts by weight of styrene polymer,
   (b) 10–50 parts by weight of flame retardant additive, the sum of (a)+(b) being 100, and optionally Bisphenylene 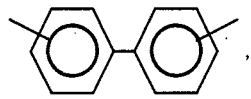, alkylene-bisphenylene 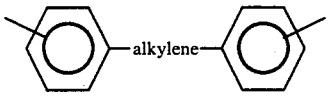

wherein alkylene = C$_1$-C$_4$ alkylene,
C$_2$-C$_4$ alkylidene,
C$_5$-C$_{12}$ cycloalkylene or
C$_6$-C$_{12}$ cycloalkylidene, thiobisphenylene 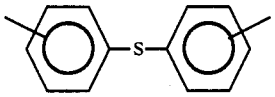, oxybisphenylene 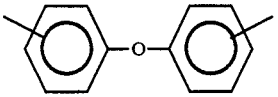, sulphonyl bisphenylene 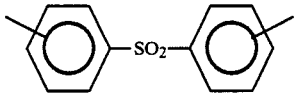, carbonyl bisphenylene 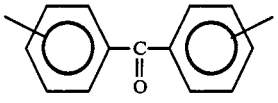, or bis(alkylene)-phenylene 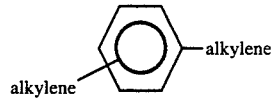

having 1–4 carbon atoms in each alkylene group, each of the phenyl nuclei of the $R_1$ and $R_3$ groups being optionally substituted by 1–4 C$_1$-C$_4$ alkyl groups or 1–4 halogen atoms (Cl, Br) or by the above mentioned alkyl groups and halogen atoms, $R_2=R_4=$hydrogen or C$_1$-C$_4$ alkyl, or $R_2$ and $R_4$ together represent an alkylene group with 1–6 carbon atoms linking the 2 nitrogen atoms, in which case $R_3$ is restricted to an alkylene group with 2–6 carbon atoms, and n represents a number from 3 to 20, the sum of parts by weight of $b_1$ and $b_2$ always adding up to a number from 10 to 50.

2. Flame resistant moulding compounds according to claim 1, characterised in that $R_1=$methyl, $R_2$ and $R_4=$hydrogen or $R^2$ and $R^4$ together represent a —CH$_2$—CH$_2$-group, in which case $R_3$ is restricted to a CH$_2$—CH$_2$-group, $R_3$ denotes at least one of the following groups:

Phenylene 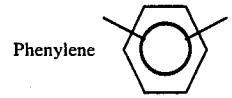

alkylene-bisphenylene 

wherein
alkylene=C$_1$-C$_4$ alkylene, in particular C$_1$-C$_2$ alkylene, and xylylene 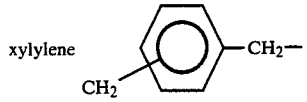

each phenyl nucleus of $R_1$ and $R_3$ being optionally substituted by 1 or 2 methyl groups, and n represents a number from 3 to 15.

* * * * *